United States Patent [19]

Thomas et al.

[11] Patent Number: 4,558,959
[45] Date of Patent: Dec. 17, 1985

[54] CONTACT THERMOCOUPLE ASSEMBLY

[75] Inventors: Dean G. Thomas, Westville; Robert J. Kopnicky, Valparaiso, both of Ind.

[73] Assignee: Bethlehem Steel Corporation, Bethlehem, Pa.

[21] Appl. No.: 664,669

[22] Filed: Oct. 25, 1984

[51] Int. Cl.$^4$ .......................... G01K 1/08; G01K 1/14; G01K 13/06
[52] U.S. Cl. ............................... 374/141; 374/153; 374/165; 374/208; 136/230
[58] Field of Search ............... 374/141, 149, 153, 154, 374/208; 136/230; 164/150

[56] References Cited

U.S. PATENT DOCUMENTS

| | | | |
|---|---|---|---|
| 2,815,663 | 12/1957 | Lupfer | 374/208 |
| 2,838,935 | 6/1958 | Cecio et al. | 374/141 |
| 2,839,594 | 6/1958 | Schneidersmann | 374/141 |
| 3,281,518 | 10/1966 | Stroud et al. | 136/230 |
| 3,400,587 | 10/1968 | Franck | 374/141 |
| 3,681,990 | 8/1972 | Barrett et al. | 374/154 |

FOREIGN PATENT DOCUMENTS

| | | | |
|---|---|---|---|
| 0097629 | 6/1983 | Japan | 374/141 |
| 0617295 | 2/1949 | United Kingdom | 374/141 |

*Primary Examiner*—Charles Frankfort
*Assistant Examiner*—Thomas B. Will
*Attorney, Agent, or Firm*—John J. Selko

[57] ABSTRACT

A thermocouple, for measuring the temperature of flat strip moving horizontally through a furnace, extends vertically into the furnace and can move vertically within a fixed guide assembly. The ceramic insulated thermocouple element, inside an outer thermocouple member, can move within the outer thermocouple member, in response to the urging of a spring, and has a contact pad composed of a metal with a melting point such that a layer of molten metal forms on the contact pad from frictional heat from the moving strip. In a second embodiment, for measuring vertically moving strip, with the thermocouple assembly horizontally positioned, the thermocouple assembly includes a second spring to urge the thermocouple assembly horizontally into the furnace against the moving strip.

6 Claims, 8 Drawing Figures

CONTACT THERMOCOUPLE ASSEMBLY

BACKGROUND OF THE INVENTION

1. Field of the Invention

This invention concerns an improved thermocouple for measuring the temperature of a flat strip moving through a heat treating furnace at high speeds, which thermocouple remains in contact with the moving strip.

2. State of the Art

In the manufacture of flat steel strip, it is sometimes necessary to heat treat the strip by processing coils of the strip through a closed, controlled atmosphere furnace. The strip, being in coil form and therefore of great length, must be moved through the furnace at high speed, in the range of 200–650 feet per minute. In some portions of the furnace, the strip moves horizontally, and in other portions of the furnace, it moves vertically, all as is well known in the art. There is a plurality of different temperature zones in the furnace which must be individually controlled in order to control the temperature of the strip therein, so as to achieve the desired strip properties.

It is critical to be able to continuously measure the temperature of the strip in each temperature zone, for proper control of the process. Usually, such strip temperature measurement is done with appropriate infrared radiation pyrometers.

However, before such pyrometers can be effectively used, they must first have their emissivity settings adjusted. Such adjustment, using a thermocouple device to contact the surface of the moving strip, remain in contact therewith, and read out the actual temperature of the strip has not been accomplished successfully and accurately before the introduction of this invention.

As the strip moves through the furnace at high speeds, it may vibrate, either gently or in a somewhat rapid, irregular and forceful manner, due to mechanical shocks imparted by the machinery. Such vibration and shocks tend to cause prior art contact thermocouples to periodically lose contact with the strip surface, thus imparting inaccuracies into the temperature readings.

In addition, the frictional heat caused by the moving strip acting against the contact thermocouple may cause the thermocouple to indicate a higher temperature than is actually present, causing improper properties in the strip, due to inaccurate temperature settings in the furnace.

There is a need, therefore, for a contact thermocouple device for measuring strip surface temperature, which device can absorb the vibrations and shocks imparted to the strip, without losing contact with the moving strip surface, without marking or scratching the surface of the moving strip, and without temperature inaccuracies caused by frictional heat.

There is a further need for such a thermocouple device which can be used for strip moving generally horizontally through a furnace portion or also generally vertically through a furnace portion.

SUMMARY OF THE INVENTION

We have invented a thermocouple device which satisfies the above objects by providing an entry port on a furnace, and an elongated fixed guide assembly extending vertically downward therein, with an elongated thermocouple assembly movable within the fixed guide. The thermocouple assembly includes a first metallic tubular member, with a front and back end, slidable within the fixed guide assembly; and a second insulator member slidable within the first tubular member, the insulator member having therein, a pair of thermocouple wires and a thermocouple junction extending outwardly to contact the moving strip; the insulator member contacting a plug slidably positioned within the back end of the first tubular member. The first tubular member and insulator member are biased in generally opposing directions by spring means therebetween.

In a second embodiment, the entry port, guide assembly and thermocouple assembly are generally horizontally positioned, and a second spring means urges the thermocouple assembly horizontally against the generally vertically moving strip surface.

DESCRIPTION OF PREFERRED EMBODIMENT AND BEST MODE

Figure 1:
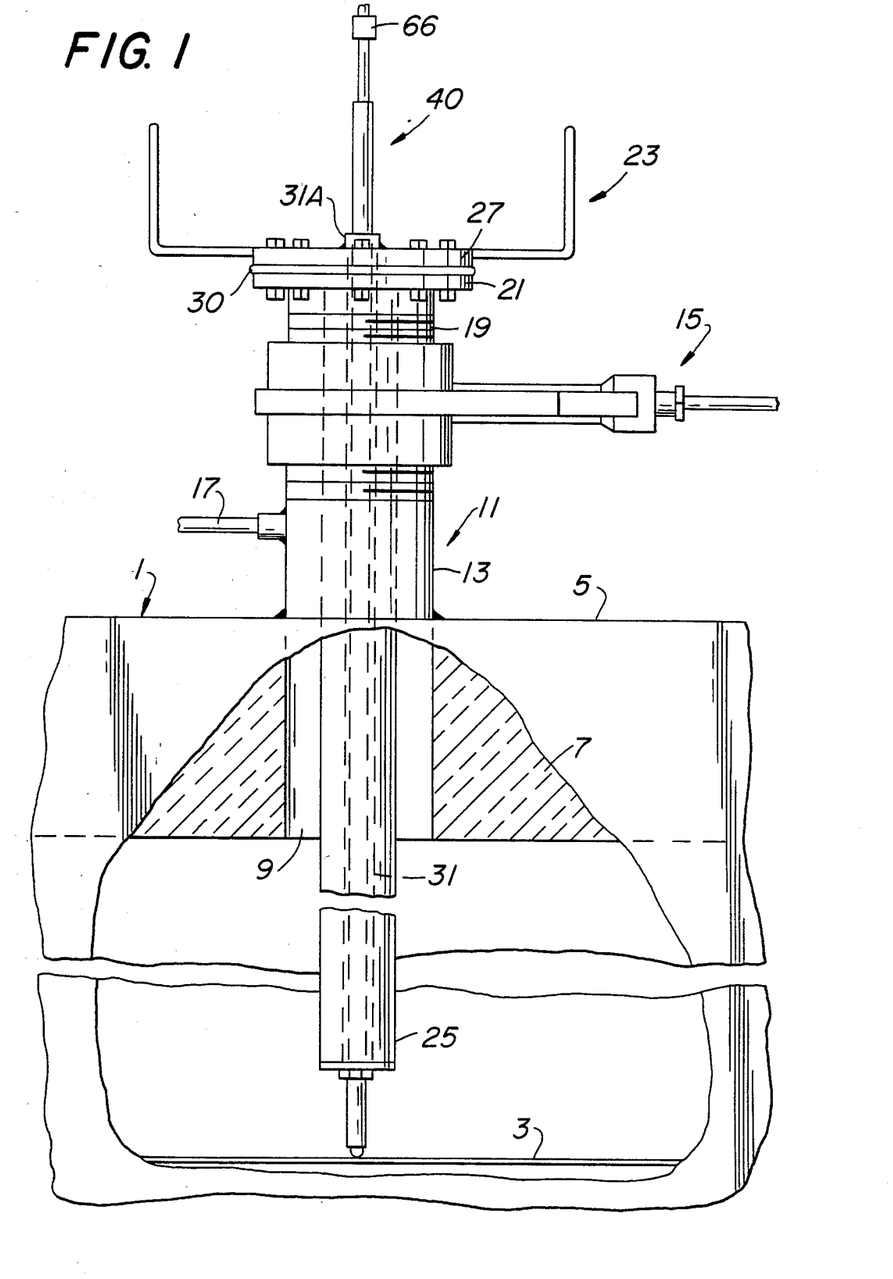
FIG. 1 shows an elevational view, partly in cross section, of the thermocouple assembly of this invention extending vertically into a furnace and contacting a horizontally moving strip.

Referring to FIG. 1, there is shown a heat treating furnace 1 having a flat strip 3 moving generally horizontally therethrough. The furnace shell 5 has attached thereto insulation 7, with an opening 9 therethrough. Inside furnace 1, the atmosphere is a controlled mixture of hydrogen and nitrogen, as is well known.

Permanently fastened, as by welding, to furnace shell 5 is entry port assembly 11. As shown more clearly in FIGS. 2 and 3, entry port 11 includes tubular side walls 13 (preferably 6 inch pipe) that carry a horizontally-disposed sliding closure valve 15. Valve 15 is closed when the thermocouple assembly is not positioned therein, so as to prevent entry of the outside atmosphere into the furnace, or exit of furnace atmosphere to the outside. Sliding closure valve 15 can be of any conventional design, but we prefer a 6" Model B1771 slide port, supplied by Tate Jones Company, Pittsburgh, Pa.

Figure 2:
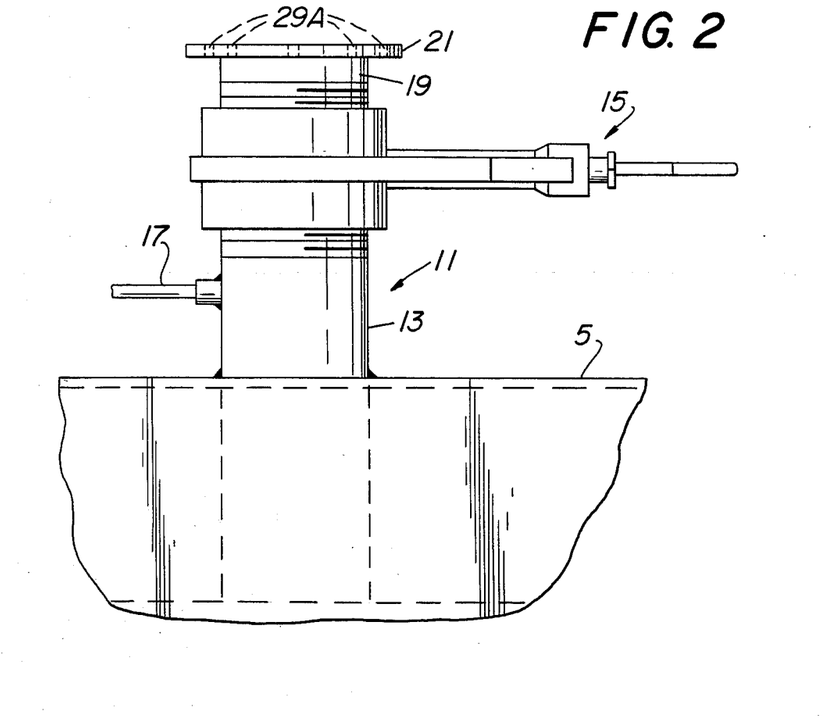
FIG. 2 is an elevational view of the entry port for the invention, on a horizontal portion of a furnace.
Figure 3:
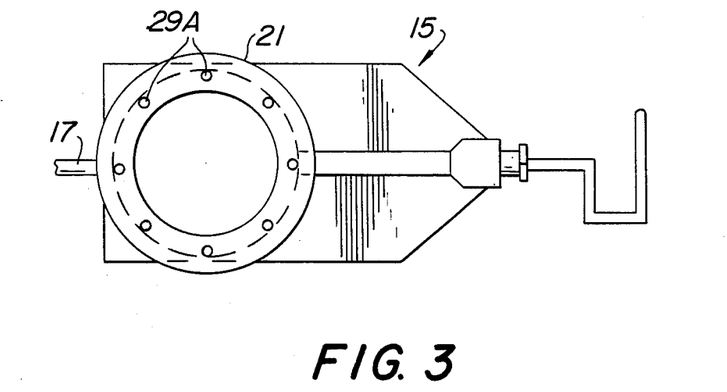
FIG. 3 is a plan view of the entry port of the invention.

An optional pipe means 17 connects into the interior of tubular side walls 13 to carry gas therethrough of the same composition as the furnace atmosphere. The pipe means 17 is connected to a suitable source of gas and pumping mechanism (not shown). Pipe means 17 minimizes the entry into the furnace of outside atmospheric gas, or exit of furnace atmosphere to the outside, when slide valve 15 is open and the thermocouple guide assembly of this invention is in place, as hereinafter described.

Entry port 11 includes a coupling 19 fitted into valve 15, which coupling 19 carries flange 21 for supporting, in fixed relationship, a thermocouple guide assembly shown generally as 23 (See FIG. 1).

Figure 4:
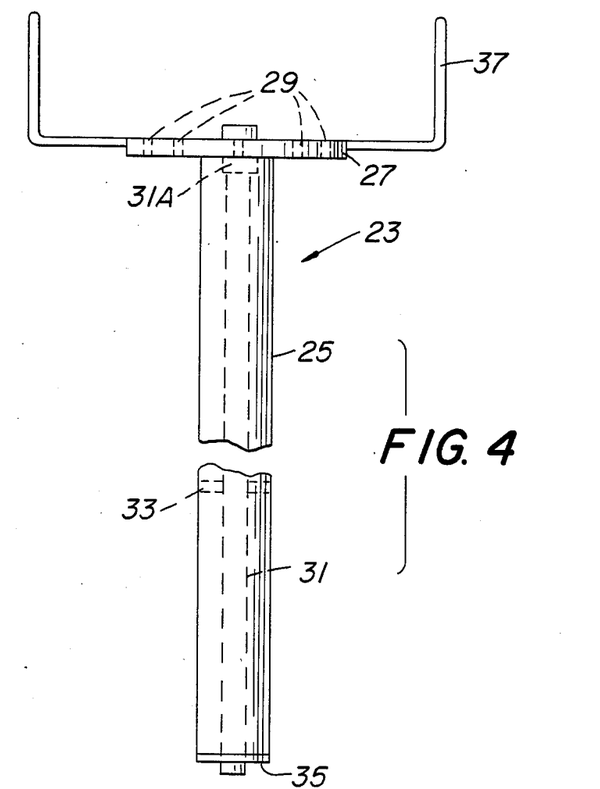
FIG. 4 is an elevational view of the fixed thermocouple guide assembly.
Figure 5:
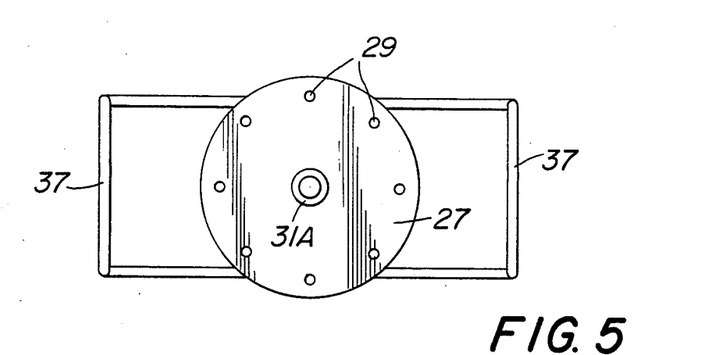
FIG. 5 is a plan view of the fixed thermocouple guide assembly.

As shown more clearly in FIGS. 4 and 5, thermocouple guide assembly 23 includes an elongated outer tubular member 25 (preferably 3" seamless pipe) having a flange 27 welded thereto. Flange 27 has a plurality of bolt holes 29 aligned to mate with bolt holes 29A of flange 21, for bolting together flanges 21 and 27. There is a suitable high-temperature gasket 30 positioned between flanges 21 and 27 (FIG. 1). Extending axially through elongated outer tubular member 25 is an inner tubular guide member 31 (preferably ¾ inch seamless pipe). Guide member 31 threads into a ¾ inch coupling 31A which extends through flange 27, and is welded thereto. Welded around the outer periphery of guide member 31, about midway along its length, and slidably fitted into the interior of outer guide member 25, is a first expansion spacer 33. At the end of guide member 25 opposite flange 27, a second expansion spacer 35 is welded to the interior of outer guide member 25. Spacer 35 allows unrestricted passage therethrough of inner guide member 31.

Thus, it can be understood that, as outer and inner guide members 25 and 31 become heated and expand at differing rates, first expansion spacer 33 slides within outer guide member 25 and second expansion spacer 35 permits second guide member 31 to expand therethrough, thereby keeping inner guide member 31 essentially axially aligned within outer guide member 25.

Finally, handles 37 are welded to flange 27 to permit removal of guide assembly 23.

Referring to FIG. 1, extending vertically downwardly through guide member 31 of fixed guide assembly 23 is a thermocouple shown generally as 40, which thermocouple 40 is movable within inner member 31 of fixed guide assembly 23. At one end, thermocouple 40 contacts moving strip 3 and at the other end, thermocouple 40 is connected to suitable thermocouple circuitry of conventional design (not shown).

Figure 6:
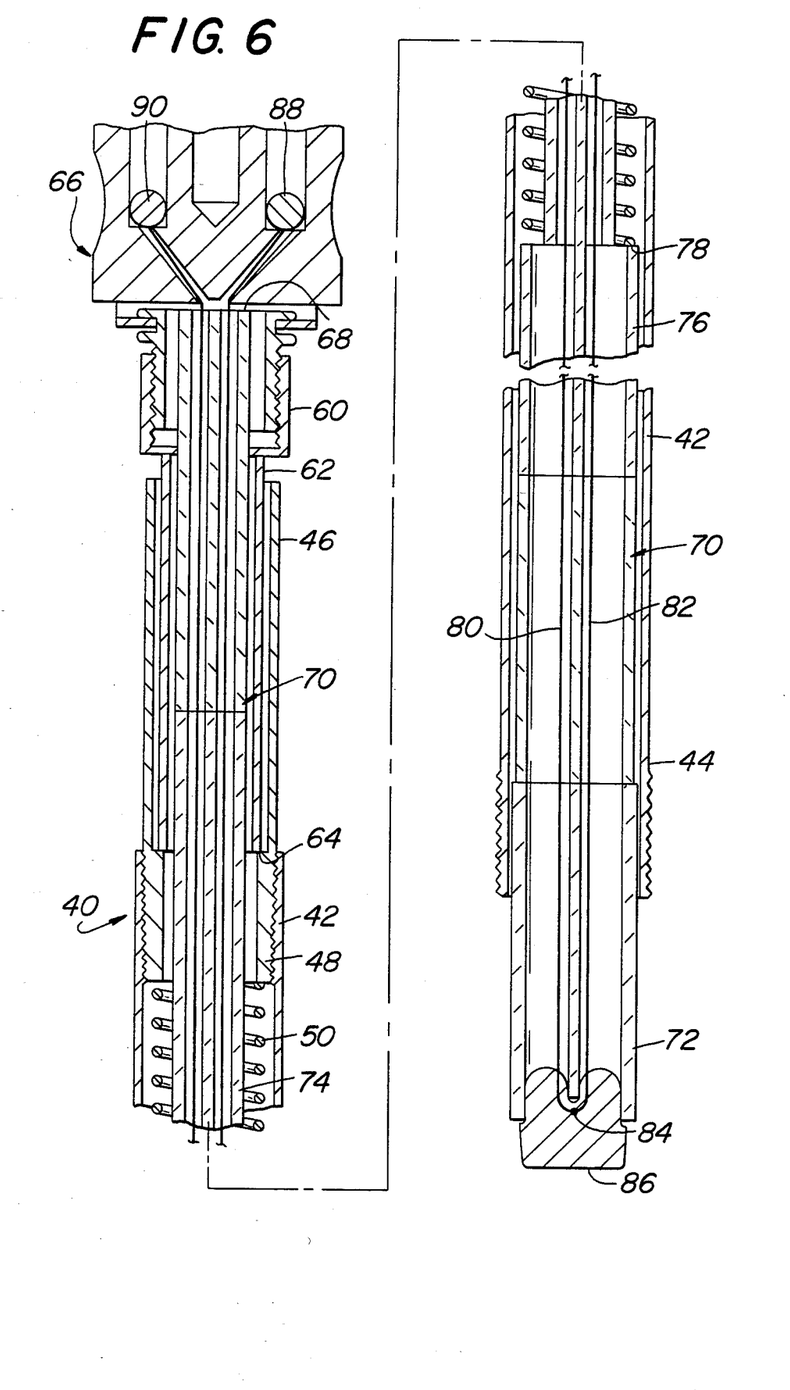
FIG. 6 is a cross-sectional view of a vertically disposed thermocouple of the invention.

As shown in FIG. 6, thermocouple 40 includes a first elongated tubular member 42 (preferably ⅞ inch seamless pipe) having a front end 44 and a back end 46. Back end 46 includes a first reduced internal diameter portion 48, that can be formed by threading a nipple into the end of tubular member 42.

Adjacent back end 46 of tubular member 42 is a helical spring 50 fitted axially inside tubular member 42. One end of spring 50 is stopped against a first reduced internal diameter portion 48. Slidably located inside back end 46 of tubular member 42 is a plug adaptor 60 having an elongated tubular body 62. Tubular body 62 is arranged to be stopped against a second reduced internal diameter portion 64 machined into back end 46, when spring 50 is fully extended, i.e. not compressed. Plug adaptor 60 is connected to a conventional thermocouple plug 66.

Slidably located within tubular member 42 is insulator member shown generally as 70. Insulator member 70 extends axially through the lengths of tubular member 42, spring 50, tubular body 62, plug adaptor 60, and into a conventional thermocouple plug 66, where it contacts the plug frame member 68. Insulator member 70 has a projecting end 72 that extends beyond the front end 44 of tubular member 42. Insulator member 70 is formed from a plurality of ceramic thermal shock insulator pieces having passages therethrough for thermocouple wires as is well known. We prefer ceramic insulator pieces as exemplified by those listed in the Claude S. Gordon Company Catalog dated 1979, pages 6 and 7, part numbers 321, 323, 327 (ordered as 3 inch lengths).

The first ceramic insulator piece that forms projecting end 72 should be of sufficient diametric cross-section to substantially fill the internal opening formed by front end 44 of tubular member 42, so as to cause tubular member 42 to provide support against vibration of ceramic end 72. Other ceramic insulator pieces in tubular member 42 up to spring 50 should be of slightly smaller diameter, so as to avoid friction, resulting from contact with the tubular member 42. However, insulator member 70 provides a reduced diameter portion 72 which fits axially through the center aperture formed by spring 50. A larger diameter portion 76 is provided on insulator member 70 to provide a stop 78 for one end of spring 50, which stop 78, combined with the stop provided by reduced diameter portion 48, seats spring 50.

A pair of spaced-apart thermocouple wires 80 and 82 extend through insulator member 70. Wires 80, 82 terminate in a thermocouple junction 84. Junction 84 is embedded in a metallic contact pad 86 of suitable material, as described hereinafter. Wires 80, 82 are insulated from each other by insulator member 70, as is well known. Wires 80, 82 extend back to connection points 88, 90 in plug 66.

We prefer to provide wires 80, 82 from chromel-alumel or iron-constantin, but other conventional wires for thermocouples can be used.

When thermocouple 40 is vertically oriented, the weight of outer tubular member 42 presses downwardly on spring 50 causing spring 50 to tend to force tubular member 42 and insulator member 70 in opposite directions, with respect to each other.

Thus, it can be understood that thermocouple 40 provides a two-fold vertical adjustment possibility in response to movement of the strip 3: (1) the entire thermocouple can raise and lower by means of movement of outer member 42 in fixed guide assembly 23; (2) insulator member 70 can move up and down *within* outer tubular member 42 in response to the urging of spring 50. This double-acting slidable movement provides extremely sensitive and continuing contact with the movement of strip 3 in furnace 1.

Metal contact pad 86 is formed from a suitable metal such as copper, brass or platinum. Pad 86 is formed by melting the chosen metal onto the end 72 of insulator member 70, and around the thermocouple tip 84. With end 72 being held vertically upward, the metal penetrates downwardly into the openings in insulator member 70, providing a physically strong and thermally continuous contact surface.

For best results, it is preferred to select the metal for pad 86 according to a relationship between the maximum temperature to be measured and the melting point of the metal for pad 86. We have discovered that if the maximum temperature to be measured is approximately 80% of melting point of pad 86, the frictional head caused by the strip rubbing against the pad 86 causes a very thin layer of pad 86 to become molten. This molten layer exhibits very low frictional resistance to the moving strip and thus, *limits* frictional heat build-up in pad 86, which heat would be sensed by thermocouple.

The following metals have been found to be effective for the indicated temperature ranges:

| MATERIAL | MELTING POINT | RANGE |
| --- | --- | --- |
| Aluminum | 1220° F. | 776° F.–976° F. |
| Brass | 1630° F. | 1100° F.–1300° F. |
| Tin | 449° F. | 250° F.–350° F. |
| Zinc | 787° F. | 429° F.–629° F. |
| Copper | 1982° F. | 1385° F.–1585° F. |
| Silver | 1762° F. | 1209° F.–1409° F. |
| Platinum | 3191° F. | 2350° F.–2550° F. |
| Lead | 621° F. | 297° F.–497° F. |

Figure 7:
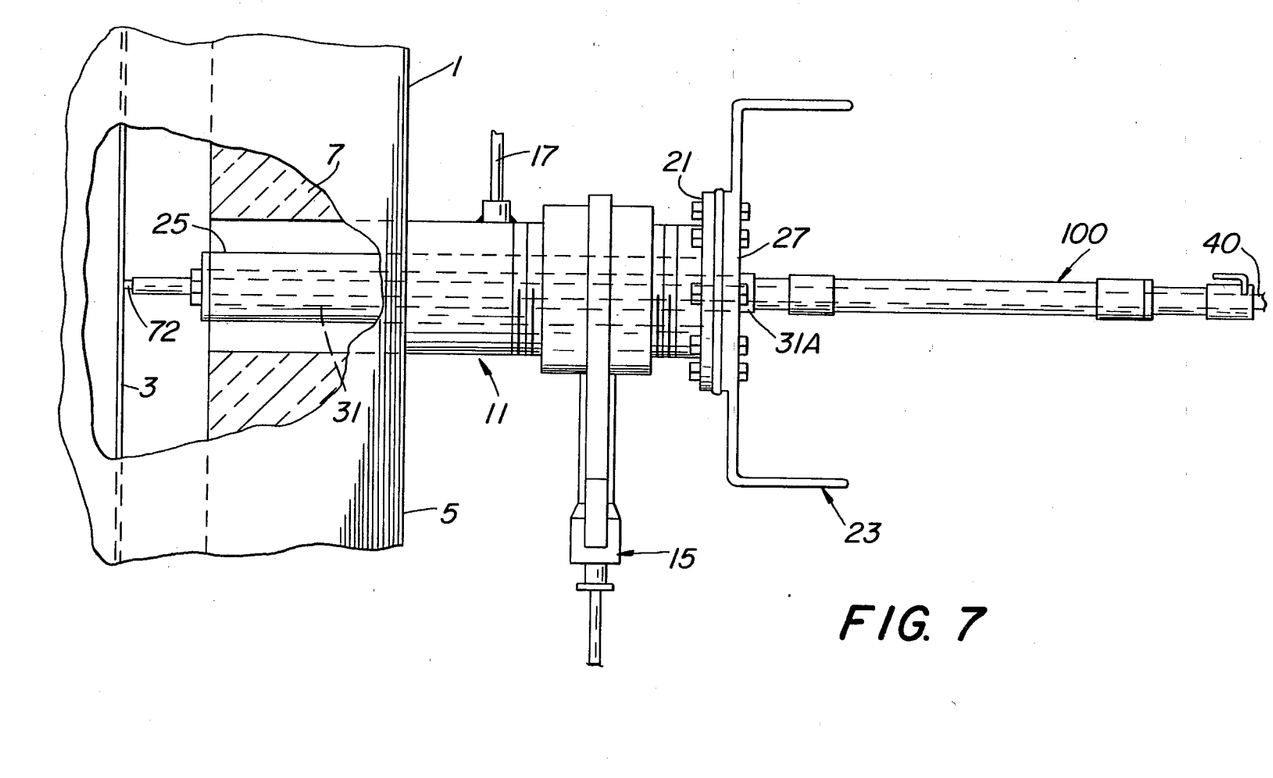
FIG. 7 is an elevational view of a spring bias means for use with a horizontally disposed thermocouple of the invention.

While we have disclosed a thermocouple 40 positioned vertically, with the weight of outer member 42 compressing spring 50, it would be equivalent to position thermocouple 40 substantially horizontally to measure the temperature of a strip 3 moving vertically in furnace 1. However, it would be necessary to provide a second spring bias means for causing the thermocouple 40 to be urged generally horizontally against the strip. FIG. 7 shows the preferred arrangement for such second spring means.

FIG. 7 shows the furnace 1 having strip 3 moving generally vertically therethrough. The following elements are essentially as previously described except for the horizontal positioning of the invention as opposed to the vertical positioning heretofore described: The furnace shell 5, entry port 11, valve 15, pipe means 17, thermocouple guide assembly 23, flanges 21, 27 outer tubular guide member 25, tubular member 31, coupling 31A, and thermocouple 40.

As shown generally in FIG. 7, a second spring bias means 100 generally externally surrounds thermocouple 40.

Figure 8:
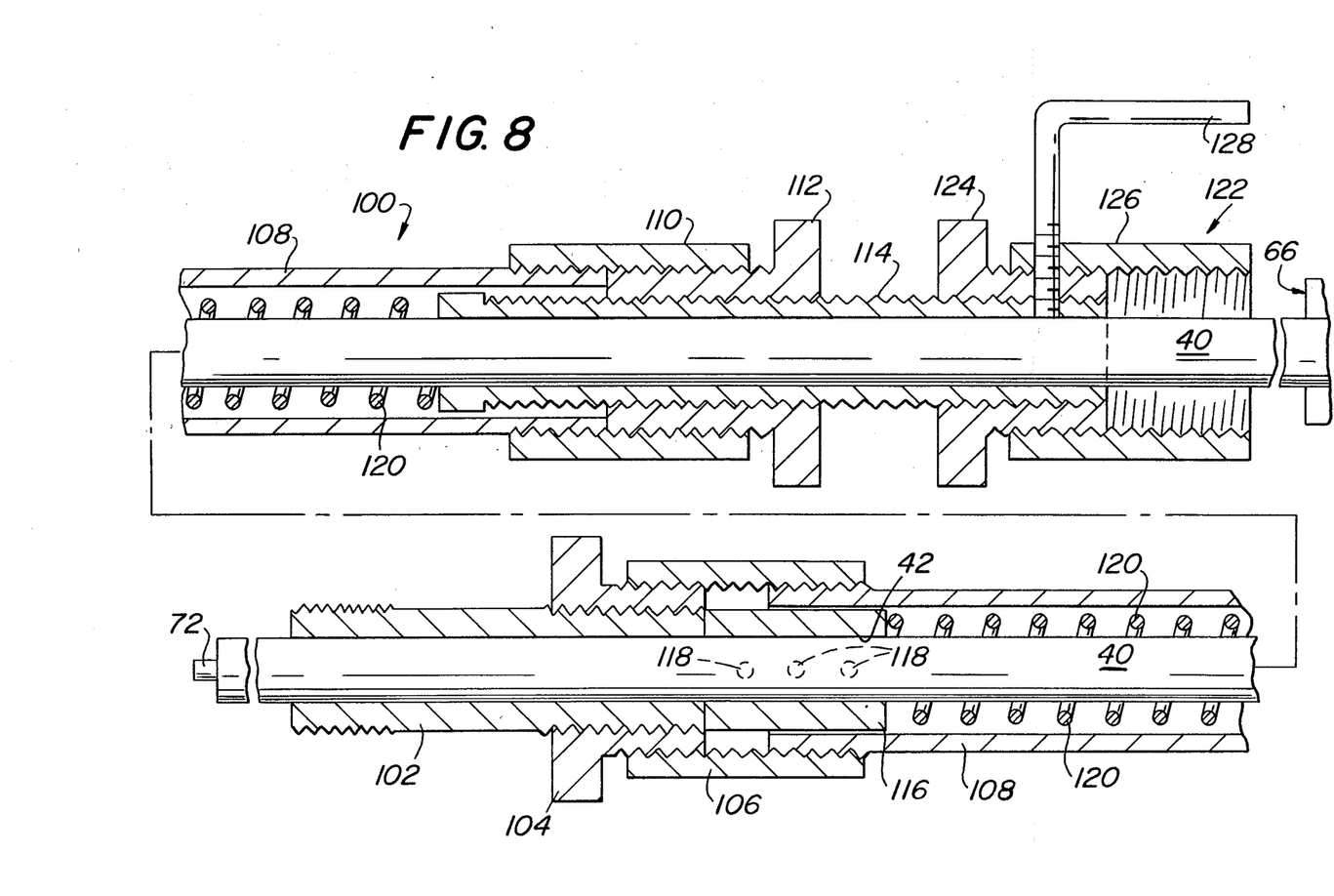
FIG. 8 is a cross-sectional view of the spring bias means of FIG. 7 for use with a horizontally disposed thermocouple of the invention.

As shown more clearly in FIG. 8, external spring bias means 100 includes a pipe nipple 102 (preferably ¾ inch) having one end threaded for fastening to coupling 31A. The other end of nipple 102 threads into a reducer 104 (¾ inch to 1 inch) which reducer 104, in turn, is threaded into one end on coupling 106 (1 inch). The other end of coupling 106 threadably receives one end of an elongated tubular member 108 (1 inch pipe). The other end of elongated member 108 threadably receives a coupling 110 (1 inch) which coupling 110 in turn threadably receives a reducer 112 (¾ inch to 1 inch). Heretofore, all threaded junctions of spring means 100 have been with standard pipe threads. Extending axially through reducer 112 is a bushing 114 having machine threads thereon, corresponding to matching machine threads internally on reducer 112.

Extending axially through spring bias means 100 is thermocouple 40. Axially surrounding tubular member 42 of thermocouple 40 is a stop block 116 carrying a plurality of set screws 118 for fastening tubular stop block 116 to metal member 42. Stop block 116 is slidable within coupling 106 and is stopped up against reducer 104.

Axially surrounding tubular member 42 and stopped against stop block 116 and bushing 114 is a helical spring 120.

Thus it can be understood that when nipple 102 is threaded into coupling 31A, external spring means 100 provides a rigid, tubular extension for guide assembly 23. The action of spring 120 urges thermocouple 40 horizontally into the furnace, as far as stop block 116 will permit. A coarse adjustment to the spring tension can be made by moving block member 116 in either direction on metal member 47. A fine adjustment of spring tension can be made by moving bushing 114 into and out of reducer 112.

A turning member 112 includes a reducer 124 (¾ inch to 1 inch) threaded onto bushing 114 and coupling 126 (1 inch). Threadably extending through coupling 126 and reducer 124 is a locking handle 128.

Thus, it should be understood that rotating of turning member 122 turns bushing 114 to change compression on spring 120.

Also, when it is desired to move contact pad 86 on tip 72 away from strip 3, thermocouple 40 can be retracted outwardly of tubular member 108, compressing spring 120. Thermocouple 40 can be locked into retracted position by turning threaded handle 128 down through bushing 114 and into contact with tubular member 42.

We claim:

1. A thermocouple assembly for contacting the surface of a flat strip moving horizontally through a furnace, to measure the temperature of the strip comprising:
   (1) entry port means in a furnace wall, for providing access to the furnace interior;
   (2) an elongated, fixed thermocouple guide assembly fastened to the entry port means and extending vertically downwardly into the furnace interior;
   (3) an elongated thermocouple movable within the guide assembly comprising:
      (a) an elongated tubular member, having a front end and a back end, slidable within the guide assembly;
      (b) an elongated insulator member slidable within the tubular member, and having a projecting end extending beyond the front end of the tubular member;
      (c) a plug adapter slidable within the back end of the tubular member and contacting the insulator member;
      (d) a pair of spaced-apart thermocouple wires extending through the insulator member and (i) terminating in a thermocouple junction in a contact pad at the projecting end of the insulator member and (ii) connected to the plug adapter;
      (e) spring means for biasing the tubular member and insulator member in opposite directions with respect to each other; and
      (f) the contact pad of (d)(i) being composed of a metal that has a melting point sufficiently close to the temperature range to be measured to cause a layer of molten metal to form on such contact pad from frictional heat between the moving strip and the contact pad.

2. The invention of claim 1 further including means for selectively opening and closing said entry port means.

3. The invention of claim 2 further including means for introducing into said entry port means a gas of the same composition as a gas from within the furnace.

4. A thermocouple assembly for contacting the surface of a flat strip moving vertically through a furnace to measure the temperature of the strip comprising:
   (1) entry port means in a furnace wall, for providing access to the furnace interior;
   (2) an elongated, fixed thermocouple guide assembly fastened to the entry port means and extending horizontally into the furnace interior;
   (3) an elongated thermocouple movable within the guide assembly comprising:

(a) an elongated tubular member, having a front end and a back end, slidable within the guide assembly;

(b) an elongated insulator member slidable within the tubular member, and having a projecting end extending beyond the front end of the tubular member;

(c) a plug adapter slidable within the back end of the tubular member and contacting the insulator member;

(d) a pair of spaced-apart thermocouple wires extending through the insulator member and (i) terminating in a thermocouple junction in a contact pad at the projecting end of the insulator member and (ii) connected to the plug adapter;

(e) first spring means for biasing the tubular member and insulator member in opposite directions with respect to each other;

(f) second spring means for biasing the tubular member horizontally in the guide assembly toward the strip; and (g) the contact pad of (d)(i) being composed of a metal that has a melting point sufficiently close to the temperature range to be measured to cause a layer of molten metal to form on such contact pad from frictional heat between the moving strip and the contact pad.

5. The invention of claim 4 further including means for selectively opening and closing said entry port means.

6. The invention of claim 5 further including means for introducing into said entry port means a gas of the same composition as a gas from within the furnace.

* * * * *